(12) United States Patent
Itmec et al.

(10) Patent No.: US 8,544,859 B2
(45) Date of Patent: Oct. 1, 2013

(54) DOLLY

(75) Inventors: Nihat Itmec, Cigil-Izmir (TR); A. Rifat Kars, Cigil-Izmir (TR); Douglas Donald, Edmond, OK (US)

(73) Assignee: Sela Products, LLC, Edmond, OK (US)

( * ) Notice: Subject to any disclaimer, the term of this patent is extended or adjusted under 35 U.S.C. 154(b) by 229 days.

(21) Appl. No.: 12/859,939

(22) Filed: Aug. 20, 2010

(65) Prior Publication Data

US 2012/0043732 A1    Feb. 23, 2012

(51) Int. Cl.
*B62B 1/00*    (2006.01)

(52) U.S. Cl.
USPC ..................... 280/79.11; 280/47.34

(58) Field of Classification Search
USPC ............... 280/79.11, 79.5, 79.7, 79.2, 47.34, 280/47.25, 47.35, 47.41; 248/128, 129
See application file for complete search history.

(56) References Cited

U.S. PATENT DOCUMENTS

| | | | |
|---|---|---|---|
| 4,060,252 A | 11/1977 | Mowery | |
| 4,077,644 A | 3/1978 | Roby et al. | |
| 4,103,857 A | 8/1978 | Levenhagen | |
| 4,720,115 A | 1/1988 | Rehrig | |
| 4,822,066 A | 4/1989 | Rehrig | |
| 4,824,129 A | 4/1989 | Rehrig | |
| 5,921,566 A * | 7/1999 | Kern et al. | 280/79.11 |
| 7,059,617 B1 | 6/2006 | Verna | |
| 2003/0163960 A1* | 9/2003 | Hadden | 52/170 |
| 2004/0090029 A1* | 5/2004 | Hardesty | 280/79.11 |

FOREIGN PATENT DOCUMENTS

GB    2207894 A    2/1989

* cited by examiner

*Primary Examiner* — John Walters
*Assistant Examiner* — James Triggs
(74) *Attorney, Agent, or Firm* — Dunlap Codding, P.C.

(57) ABSTRACT

A dolly has a frame with a pair of risers connected thereto. Connecting bolts extend partially through the risers and through the frame to connect the risers and casters to the frame. The risers have an outer riser body with a core disposed therein. The outer riser body may be a thermoplastic injection molded riser body that is molded around a riser core which may be a metal riser plate core.

19 Claims, 4 Drawing Sheets

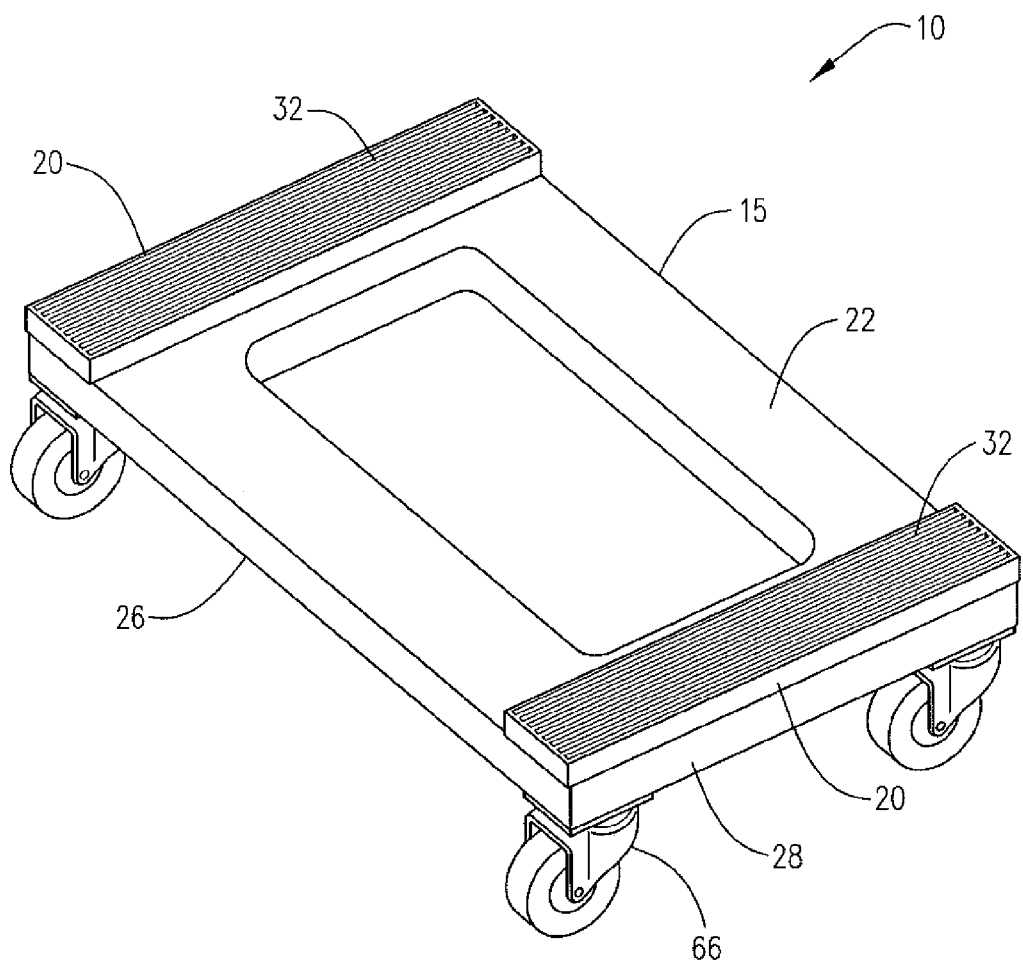
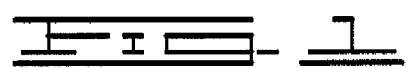
FIG-1

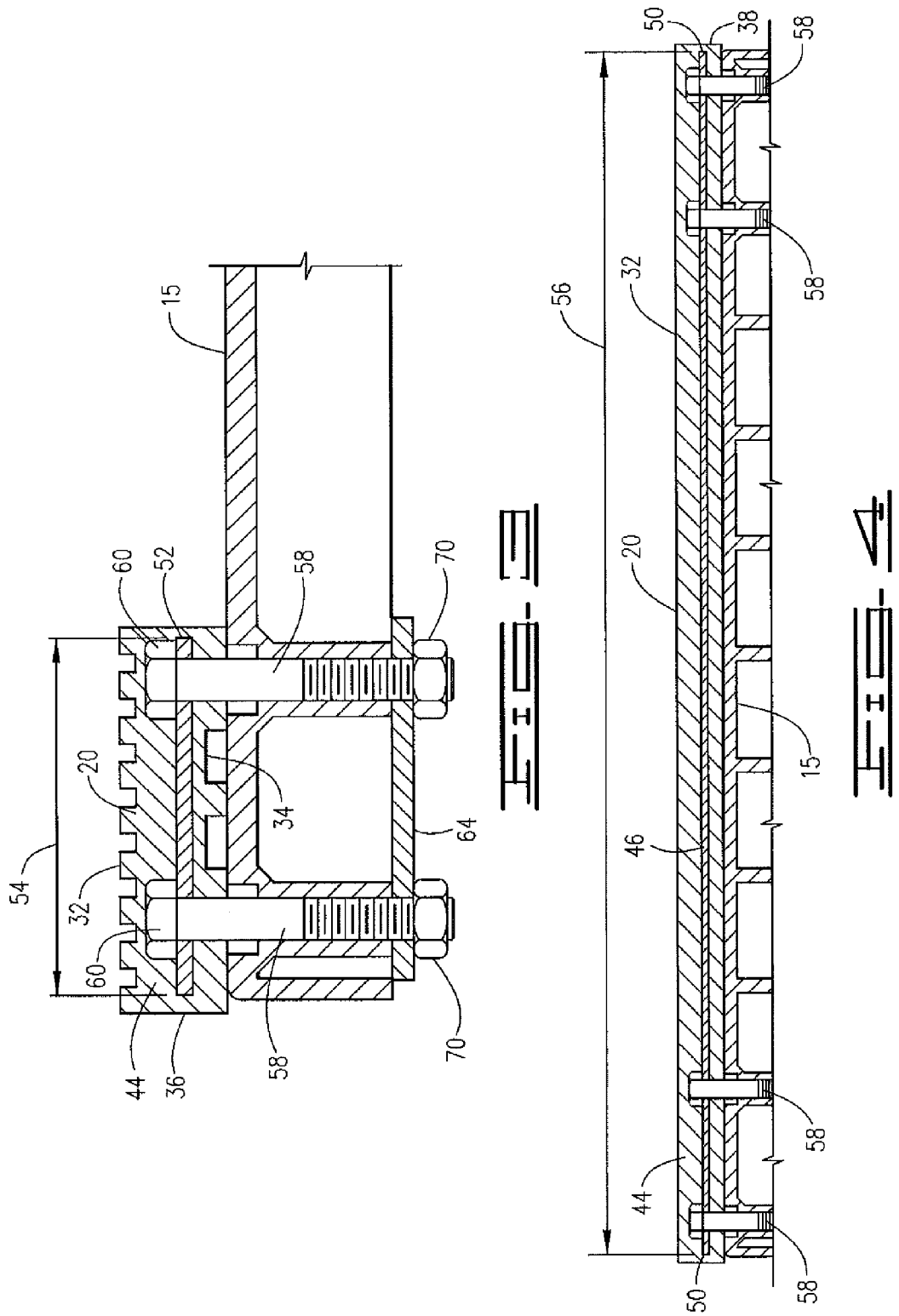

DOLLY

This disclosure relates to a dolly with a plastic frame having risers connected thereto. Plastic dollies with rectangular frames having side members and end members with risers connected to the end members are known. There are a number of such plastic dollies and most require various stages of assembly. There is a continued need for plastic dollies that have sufficient strength to support loads thereon but that are also easily assemblable and disassemblable.

SUMMARY

A wheeled dolly for moving and transporting loads has a dolly frame with an upper surface and a lower surface. The lower surface of the dolly frame may be a honeycomb or cellular configuration. A plurality of openings for receiving caster bolts extend through the dolly frame. The dolly includes at least one and preferably two risers connected to the frame. The caster bolts will extend from the riser through the frame into caster plates to connect the caster plates thereto. The caster plates will be connected to wheeled casters.

Each of the risers comprises a riser body with a riser plate disposed therein. The riser body is formed of a first material which may be for example a thermoplastic material and the riser plate is comprised of a second material which is weldable and may be for example hot rolled steel. The riser plate in the embodiment disclosed is completely encapsulated or embedded in the riser body.

The caster bolts that connect the riser to the frame and likewise connect the casters to the frame extend partially through the riser body. The caster bolts are affixed for example by welding to the metal riser plate and extend from the metal riser plate through a lower surface of the riser. In one embodiment the riser body is a thermoplastic injection molded riser body that is molded around the metal riser plate and a portion of each of the caster bolts.

BRIEF DESCRIPTION OF THE DRAWINGS

FIG. 1 is a perspective view of a dolly according to the current disclosure.

FIG. 3 is a section view taken from line 3-3 of FIG. 2.

FIG. 4 is a section view from line 4-4 of FIG. 2.

DETAILED DESCRIPTION OF A PREFERRED EMBODIMENT

Figure 2:
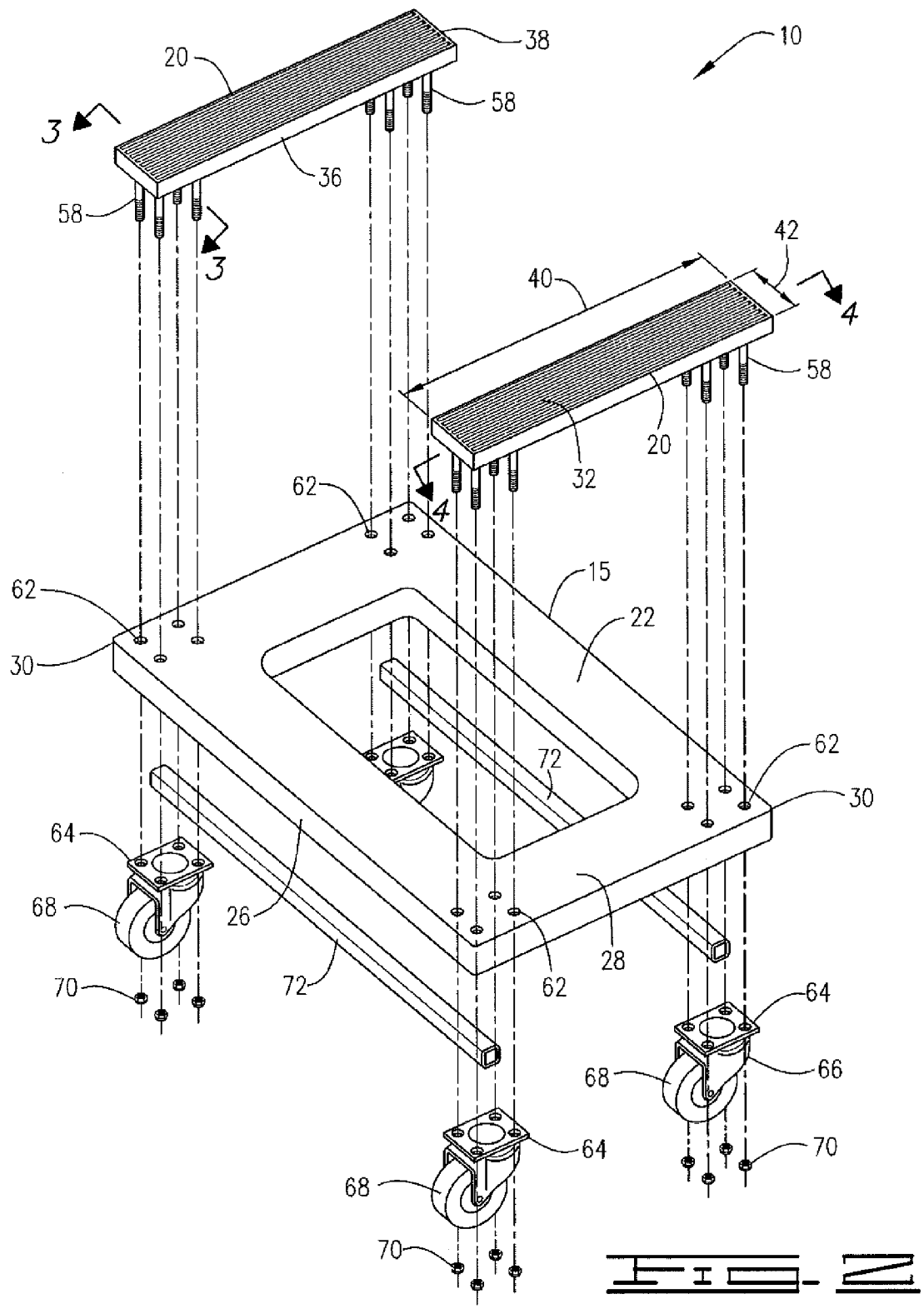
FIG. 2 is an exploded view of the dolly of the current disclosure.

Referring now to the drawings and more particularly to FIG. 1, a dolly 10 which may be a plastic dolly 10 has frame 15 with a pair of risers 20 connected thereto. Frame 15 is preferably a generally rectangular frame. Frame 15 has top 22 and bottom 24. Bottom or under side 24 may be a honeycomb or cellular configuration as shown in the view of FIG. 4.

Frame 15 is preferably a thermoplastic frame and may be for example HDPE. Frame 15 is generally rectangular and has side members 26 and end members 28 connected by rounded corners 30.

Risers 20 may be connected to frame 15 and as shown in FIG. 1 are mounted to extend across the ends 28 on top 22 of frame 15. Although risers 20 are shown connected at end members 28, it is understood that risers can be attached to side members 26 as well. Risers 20 have top surface 32, bottom surface 34 and are generally rectangular risers with sides 36 and ends 38. Riser 20 has a length 40 that extends between ends 38 thereof and a width 42 that extends between sides 36 thereof. Riser 20 may comprise a riser body 44, which may be referred to as an outer riser body, with a riser core 46 disposed therein. Riser body 44 is preferably a thermoplastic riser body for example a thermoplastic elastomer. Core 46 is comprised of a different material so that riser body 44 is comprised of a first material and riser core 46 is comprised of a second material different than the first material. Riser core 46 may be for example made from a metal, so that riser core 46 is a metal riser plate 48. Metal riser plate 48 may have ends 50 and sides 52. A width 54 extends between sides 52 and length 56 between ends 50. Length 56 and width 54 of the metal riser plate 48 are less than the length and width respectively of riser body 44, which is as shown in the drawings the same as the length 40 and width 42 of riser 20. Metal riser plate 48 in the embodiment shown is completely covered by riser body 44. Metal riser plate 48 is thus completely embedded in, or encapsulated by riser body 44. Riser body 44 may be molded around metal riser plate 48 so that it is completely covered and no portion of metal riser plate 48 is exposed. Although the embodiment described herein has a metal plate completely encapsulated by riser body 44, the ends and/or sides of the metal plate may be exposed if desired.

Figure 5:
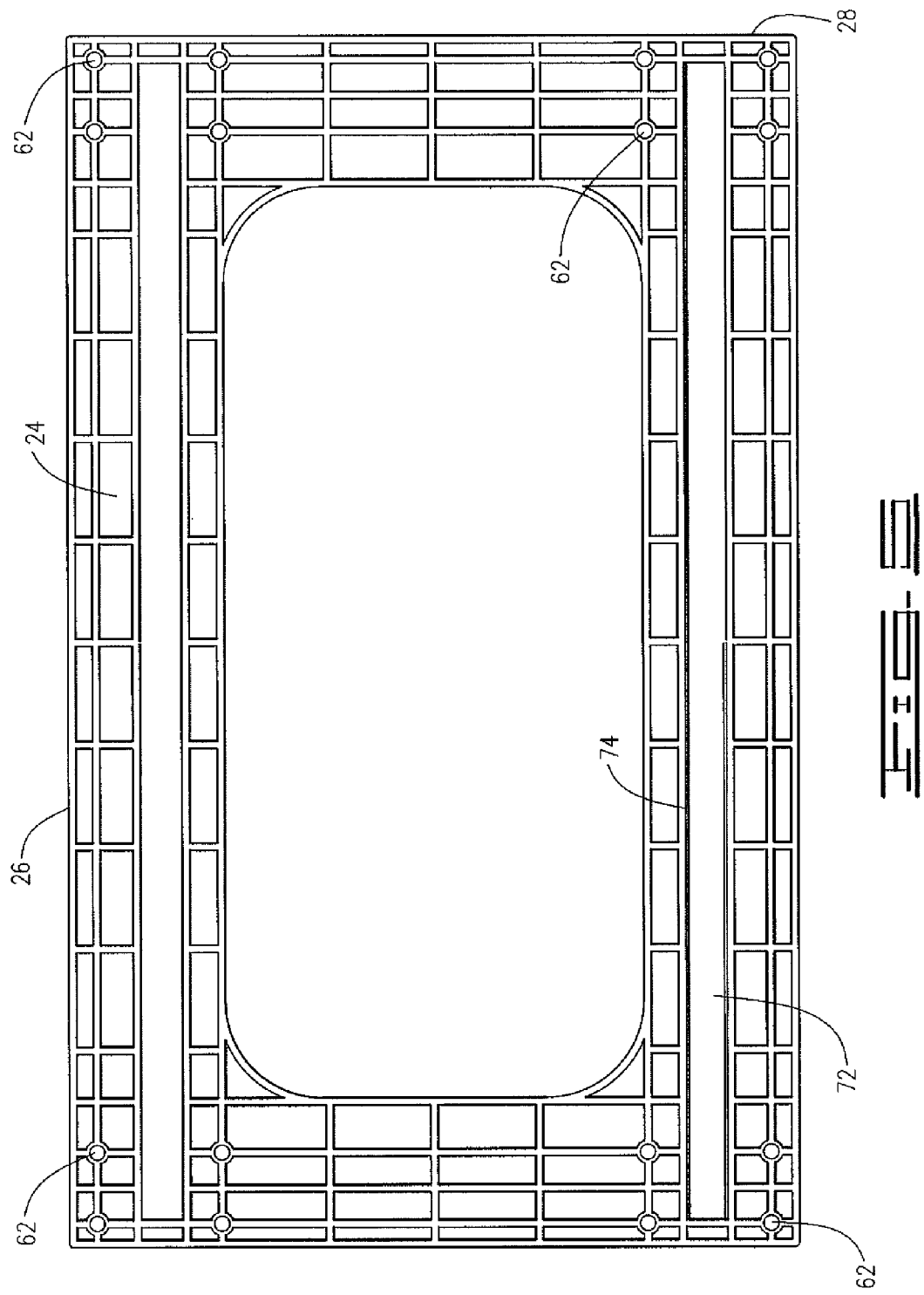
FIG. 5 is a view of the under side of the dolly.

Dolly 10 further includes a plurality of connecting, or caster bolts 58 with heads 60 thereon. Connecting bolts 58 extend through holes or openings 62 in riser body 44 and also through holes in caster plates 64. Caster plates 64 are connected to casters 66 with wheels 68 mounted thereto. A plurality of nuts 70 may be utilized in combination with bolts 58 to connect caster plate 64 to dolly frame 15. Dolly 10 may also include reinforcing bars 72 which may be placed in reinforcing channels 74 as shown in FIG. 5. Reinforcing bars 72 will be held in place by caster plate 64.

Referring now to FIGS. 3 and 4, connecting bolts 58 extend through metal riser plate 48 and through bottom surface 34 of riser 20 which is the bottom surface of the riser body 44. FIG. 3 is a partial section taken at the location of bolts 58, and showing riser 20 and frame 15 in cross section. Bolts 58 are not shown in cross section in FIG. 3. Bolts 58 do not extend through top surface 32 of riser 20 and thus only partially through riser 20. Bolts 58 are affixed to the metal plate. For example, bolts heads 60 may be welded to riser plate 48 and extend downwardly through metal riser plate 48 and through bottom surface 34 of riser body 44. Metal riser plate 46 may thus be a weldable metal, such as for example hot rolled steel. Riser body 44 may be molded around metal plate 48 and around a portion of each of connecting bolts 58, for example around bolt heads 60 and a portion of the shaft of each of connecting bolts 58. The remainder of the shaft of connecting bolt 58, including the threaded portion thereof extends from riser 20 and will pass through opening 62 so that caster plates 64 may be connected to riser 20 as described herein. Riser body 44 may be injection molded using a known process. Thus, metal plate 48, along with a portion of connecting bolts 58 may be placed in the mold tooling and material for the riser body 44 is injected into the tooling so that it will encapsulate metal riser plate 48 and a portion of connecting bolts 58.

Thus it is seen that the present invention is well adapted to carry out the objects and attain the ends and advantages mentioned above as well as those inherent therein. While certain preferred embodiments of the invention have been described for the purpose of this disclosure, numerous changes in the construction and arrangement of parts and the performance of steps can be made by those skilled in the art, which changes are encompassed within the scope and spirit of this invention as defined by the appended claims.

What is claimed is:

1. A dolly comprising:
   a dolly frame defining an upper surface, the dolly frame having a plurality of openings therethrough for receiving bolts;
   at least one riser having a riser body shaped in a mold around a riser plate;
   a plurality of bolts having a vertical axis and a length, the bolts fixed against rotation about the vertical axis and against movement along the length of the bolts to the riser plate of the at least one riser, wherein the bolts are at least partially encapsulated by the riser body of the at least one riser, the bolts extending from the at least one riser through the openings in the frame; and
   casters connected to the dolly frame.

2. The dolly of claim 1, wherein the bolts connect the casters to the dolly frame.

3. The dolly of claim 1, the riser plate comprising a metal riser plate, the bolts being welded to the metal riser plate.

4. The dolly of claim 1, the frame comprising a generally rectangularly shaped frame, wherein a pair of the risers are attached to the frame with bolts extending therefrom.

5. The dolly of claim 1, wherein the riser body is a thermoplastic outer body.

6. The dolly of claim 1, wherein the riser body is shaped in the mold around the riser plate and a portion of the bolts.

7. A dolly comprising:
   a dolly frame;
   two risers connected to the dolly frame, the risers comprising:
     an outer riser body with upper and lower surfaces; and
     an inner core positioned between and spaced a distance from the upper and lower body surfaces;
   a plurality of connecting bolts having a vertical axis and a length, the connecting bolts fixed against rotation about a vertical axis and against movement along the length of the connecting bolts to the inner core and extending from the inner core through the lower surface of the outer body, wherein the connecting bolts connect the risers to the dolly frame; and
   casters connected to the dolly frame.

8. The dolly of claim 7, wherein the connecting bolts connect the casters to the dolly frame.

9. The dolly of claim 7, the inner core comprising a metal riser plate, the connecting bolts being welded to the metal plate.

10. The dolly of claim 7, the frame comprising a generally rectangularly shaped frame with a pair of side members and a pair of end members connected to the side members.

11. The dolly of claim 10, wherein each of the pair of end members has one of the two risers connected thereto.

12. The dolly of claim 7, wherein the outer riser body is shaped in a mold around the inner core and a portion of each of the connecting bolts.

13. A dolly comprising:
    a frame having a pair of end members and a pair of side members;
    a pair of risers, each riser comprising:
      a riser body of a first material; and
      a riser plate of a second material different than the first material, the riser plate being positioned between upper and lower surfaces of the riser body wherein the riser body is shaped in a mold around the riser plate;
    a plurality of connecting bolts extending from the risers through the rectangular frame to connect the risers to the frame, wherein the connecting bolts are fixed to the riser plate and extend only partially through the riser; and
    casters connected to the frame.

14. The dolly of claim 13 wherein the riser plate is a metal plate.

15. The dolly of claim 13, the riser body comprising a thermoplastic elastomer shaped in the mold around the riser plate and a portion of each of the connecting bolts.

16. The dolly of claim 15, the connecting bolts being welded to the riser plate.

17. The dolly of claim 13, wherein the connecting bolts connect the casters to the frame at corners thereof.

18. The dolly of claim 13 wherein each of the risers comprises a plastic riser body shaped in the mold around a metal riser plate, the connecting bolts extending through the metal riser plate.

19. The dolly of claim 18, wherein the connecting bolts are fixed to the metal riser plate.

* * * * *